(12) United States Patent
Nomani et al.

(10) Patent No.: US 12,164,506 B2
(45) Date of Patent: Dec. 10, 2024

(54) SYSTEMS AND METHODS FOR SIMULTANEOUS RECORDATION OF MULTIPLE RECORDS TO A DISTRIBUTED LEDGER

(71) Applicant: Verizon Patent and Licensing Inc., Basking Ridge, NJ (US)

(72) Inventors: Muhammad Salman Nomani, Hillsborough, NJ (US); John M. Stokes, Yorba Linda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/060,647

(22) Filed: Dec. 1, 2022

(65) Prior Publication Data
US 2024/0184769 A1    Jun. 6, 2024

(51) Int. Cl.
*G06F 16/23* (2019.01)
*G06F 21/60* (2013.01)

(52) U.S. Cl.
CPC ........ *G06F 16/2379* (2019.01); *G06F 21/602* (2013.01)

(58) Field of Classification Search
CPC ........................... G06F 16/2379; G06F 21/602
USPC ......................................................... 707/703
See application file for complete search history.

(56) References Cited

U.S. PATENT DOCUMENTS

| | | | |
|---|---|---|---|
| 11,416,832 B2* | 8/2022 | Gamaroff | H04L 63/12 |
| 11,488,159 B1* | 11/2022 | Murao | G06Q 40/12 |
| 2017/0236120 A1* | 8/2017 | Herlihy | G06Q 20/065 |
| | | | 705/67 |
| 2020/0167741 A1* | 5/2020 | Gamaroff | H04L 63/12 |
| 2020/0272618 A1* | 8/2020 | Hughes | H04L 9/3236 |
| 2020/0396065 A1* | 12/2020 | Gutierrez-Sheris | |
| | | | H04L 9/3297 |
| 2022/0147983 A1* | 5/2022 | Marsh | G06F 16/2379 |
| 2022/0147990 A1* | 5/2022 | Marsh | H04L 9/0643 |

OTHER PUBLICATIONS

Yongge Wang, "Byzantine Fault Tolerance in Partial Synchronous Networks," Cryptology ePrint Archive 2019/1460 (2020), available at https://eprint.iacr.org/2019/1460.pdf.

(Continued)

*Primary Examiner* — Hosain T Alam
*Assistant Examiner* — Nicholas E Allen

(57) ABSTRACT

A device described herein may maintain a distributed ledger that is also maintained by at least one other device, where the distributed ledger includes at least a particular record. The device may receive a first record and a second record for recordation to the distributed ledger, where the first and second records each include a reference to the particular record, and where the first and second records further respectively include first and second values. The device may compare, based on the first and second records each including the reference to the same particular record, the first value to the second value. The device may determine, based on the comparing, a sequence of the first and second records, and may maintain information indicating that the distributed ledger includes the first and second records. The information may further indicate the determined sequence of the first and second records.

20 Claims, 14 Drawing Sheets

(56) References Cited

OTHER PUBLICATIONS

Leach et al., "A Universally Unique IDentifier (UUID) URN Namespace," Network Working Group Request for Comments 4122 (2005), available at https://www.rfc-editor.org/rfc/pdfrfc/rfc4122.txt.pdf.

Momose et al., "Hybrid-BFT: Optimistically Responsive Synchronous Consensus with Optimal Latency or Resilience," Cryptology ePrint Archive 2020/0406 (2020), available at https://eprint.iacr.org/2020/406.pdf.

Ittai Abraham, "Synchrony, Asynchrony and Partial Synchrony" (2019), available at https://decentralizedthoughts.github.io/2019-06-01-2019-5-31-models/.

Wikipedia, "Byzantine Fault" (latest edit Nov. 12, 2022), available at https://en.wikipedia.org/wiki/Byzantine_fault.

\* cited by examiner

SYSTEMS AND METHODS FOR SIMULTANEOUS RECORDATION OF MULTIPLE RECORDS TO A DISTRIBUTED LEDGER

BACKGROUND

Distributed ledgers, such as blockchains, provide for the decentralized and secure storage of data. Distributed ledgers may further provide for the immutability of recorded data, as data may not be altered once recorded to a distributed ledger. Distributed ledgers may utilize mechanisms to maintain a sequence of recorded data, such as each record of a given distributed ledger including a reference to an immediately preceding record of the distributed ledger.

DETAILED DESCRIPTION OF EXAMPLE EMBODIMENTS

The following detailed description refers to the accompanying drawings. The same reference numbers in different drawings may identify the same or similar elements.

Distributed ledgers, such as blockchains, may provide for a decentralized, immutable mechanism by which data may be recorded and/or retrieved. A given distributed ledger may be established and/or maintained by two or more nodes, which may each be implemented by distinct sets of hardware resources that may be associated with different, independent entities. Each node associated with a distributed ledger may maintain a local copy of the distributed ledger. The distributed ledger may be "distributed" inasmuch as the local copy maintained by each node matches the local copy maintained by the other nodes (e.g., by at least a threshold proportion, quorum, "consensus," etc. of the other nodes) associated with the distributed ledger. Thus, while each node independently maintains the distributed ledger, a local copy of the distributed ledger obtained from a particular node may be representative of the distributed ledger as maintained by the other nodes.

Figure 1:
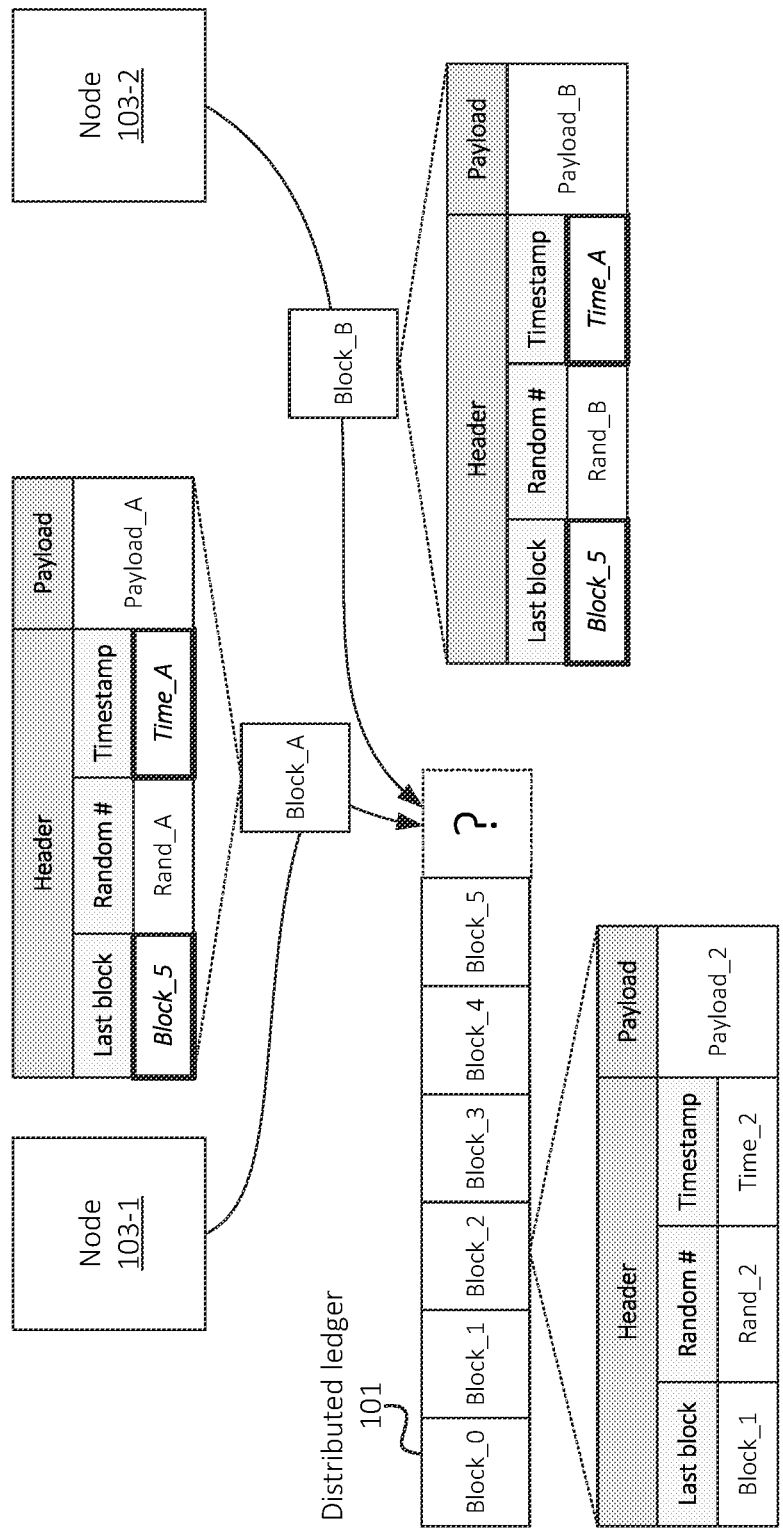
FIG. 1 illustrates an example situation in which multiple blocks may be proposed simultaneously for recordation to a distributed ledger.

In some embodiments, information may be added (e.g., appended) to a distributed ledger in the form of blocks, records, etc. (referred to herein simply as "blocks" for the sake of brevity). For example, as shown in FIG. 1, distributed ledger 101 may be maintained by nodes 103-1, 103-2, and/or one or more other nodes 103. In this example, distributed ledger 101 may include six example blocks, "Block_0" through "Block_5." For example, nodes 103-1 and 103-2 may each maintain these six blocks and may further maintain information indicating a sequence of the blocks. In some embodiments, the sequence may be determined based on information included in each block.

For example, as shown each block may include header information, which may include a reference to a "last block," a random number, a timestamp, and/or other suitable information. Each block may also include a payload, which may include information that is immutably maintained or represented in distributed ledger 101, such as a smart contract, a non-fungible token ("NFT"), a public key used for a cryptographic key exchange (e.g., a Diffie-Hellman key exchange), or other types of information.

In some embodiments, all of the information included in a given block may be generated, provided, etc. by a particular node 103 that is authorized to record information to distributed ledger 101 (e.g., propose blocks for recordation to distributed ledger 101). For example, in some embodiments, distributed ledger 101 may be a private blockchain for which particular nodes 103 are designated as authorized to record information to distributed ledger 101 (e.g., other nodes 103 may maintain information indicating which particular nodes 103 are authorized to record information to distributed ledger 101). As another example, nodes 103 may implement a protocol or technique whereby one node 103 is selected (e.g., randomly, in a round-robin fashion, and/or in some other manner) as authorized to record information to distributed ledger 101 at any given time. In some embodiments, multiple nodes 103 may be authorized to record information to distributed ledger 101 at any given time.

The "last block," included in a header of a particular block, may include an identifier or value that represents, is derived from, and/or is otherwise associated with a latest block in distributed ledger 101 that was present before the particular block was recorded to distributed ledger 101. For example, as shown, Block_2 may include a reference to Block_1. For example, Block_2 may have been added to distributed ledger 101 by a particular node 103, and the particular node 103 may have determined that Block_1 was the latest, last, most recent, etc. block in distributed ledger 101 prior to recordation of Block_2. Based on Block_1 having been the latest block in distributed ledger 101 prior to recordation of Block_2, the particular node 103 may have set Block_1 as the "last block" in the header of Block_2.

In some embodiments, the "last block" value may include a cryptographic hash of the previous block (e.g., the "last block" of Block_2 may include a cryptographic hash of the entirety of Block_1). In some embodiments, the "last block" value may include a cryptographic hash of a portion of the previous block (e.g., the "last block" of Block_2 may include a cryptographic hash of the header of Block_1). In some embodiments, the "last block" value may include an unprocessed or raw value included in the previous block (e.g., the "last block" of Block_2 may include the random number of Block_1, may include the timestamp of Block_1, and/or some other value included in Block_1). In some embodiments, the "last block" value may include a combination or concatenation of values included in the previous block (e.g., the "last block" of Block_2 may include the random number of Block_1 appended to the timestamp of Block_1, may include the random number of Block_1 appended to the "last block" value of Block_1, etc.). While some examples are presented above, in practice, the "last block" value for a given block may include any suitable value that uniquely identifies an immediately preceding block.

The random number included in each block may, in some embodiments, include or be a function of a unique identifier associated with each node 103. For example, a given node 103 may be or may be implemented by a User Equipment ("UE"), such as a mobile phone, an Internet of Things ("IoT") device, or some other wireless communication device. Such UEs may be associated with, for example, a Mobile Directory Number ("MDN"), an International Mobile Station Equipment Identity ("IMEI"), an International Mobile Subscriber Identity ("IMSI"), a Subscription Permanent Identifier ("SUPI"), a Globally Unique Temporary Identifier ("GUTI"), a Media Access Control ("MAC") address, and/or other identifier that uniquely identifies a given UE. In some embodiments, each node 103 may be associated with some other type of unique identifier, such as a Universally Unique Identifier ("UUID"), a Globally Unique Identifier ("GUID"), a hardware identifier, a serial number, or other type of identifier. In some embodiments, such identifier may be used as a seed for a random number generator that generates the random number included in the header of a given block. As another example, the identifier may be combined with (e.g., appended to) a randomly generated number. In this sense, the "random number" included in a given block may, in some embodiments, include a random component and a fixed component (e.g., where the fixed component includes the identifier, or a portion thereof, of a given node 103). In some embodiments, the random number may be independent of, and/or may otherwise not be associated with, a unique identifier of any particular node 103.

The timestamp of a given block may include a time at which the block was generated, created, etc. by a particular node. For example, as shown, nodes 103-1 and 103-2 may each generate a respective block (i.e., Block_A and Block_B) at the same time ("Time_A"). Since nodes 103-1 and 103-2 have each generated these blocks at the same time, Block_A and Block_B both reference Block_5 as their respective "last block." As referred to herein, the "simultaneous" proposal, submission, attempted recordation, etc. of multiple blocks (e.g., Block_A and Block_B) may refer to the proposal, submission, attempted recordation, etc. of such blocks prior to the committing (e.g., the addition to distributed ledger 101 by some or all nodes 103) of either block. That is, since Block_A has not been committed as of the time of proposal of Block_B, and further since Block_B has not been committed as of the time of proposal of Block_A, then Block_A and Block_B may be considered to be received, proposed, etc. "simultaneously." Thus, even if the timestamps of these blocks are different, these blocks may still be considered "simultaneous." A block may be "committed" to distributed ledger 101 if a consensus is reached with respect to the block, such as communications between nodes 103 confirming that the block has been added to distributed ledger 101 by such nodes 103.

Figure 2:
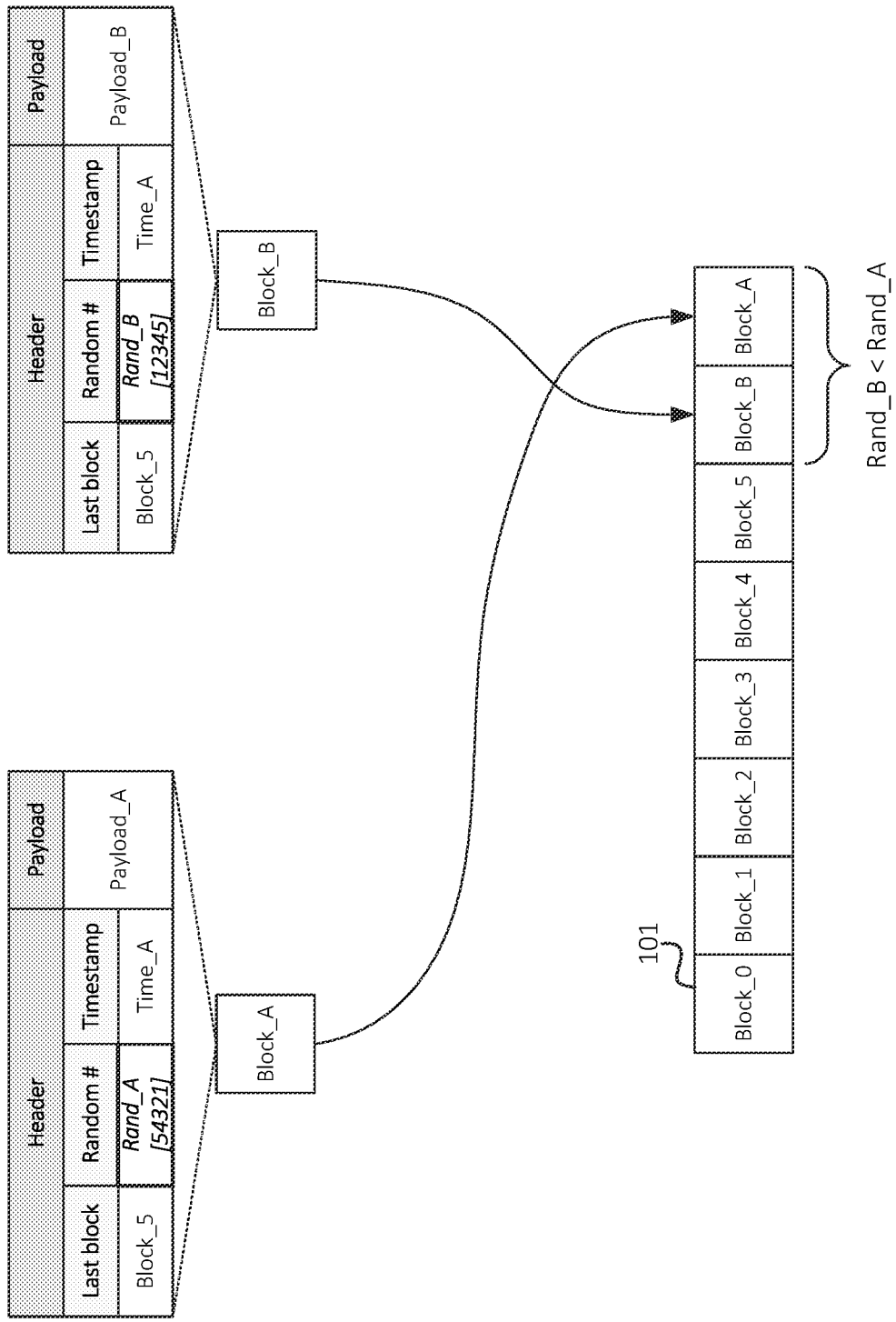
FIG. 2 illustrates an example of recording simultaneously received blocks to a distributed ledger, in accordance with some embodiments.

In accordance with embodiments described herein, the nodes 103 that maintain distributed ledger 101 may determine a sequence of the simultaneously proposed blocks (i.e., Block_A and Block_B, in the examples described herein), even though such blocks indicate the same "last block." For example, as shown in FIG. 2, Block_B may be determined by nodes 103 (e.g., by each node 103 that maintains distributed ledger 101) as being the next block to add to distributed ledger 101, and nodes 103 may determine that Block_A is a subsequent block to add to distributed ledger 101 after Block_B. For example, in some embodiments, each node 103 may determine that the random number of Block_B is lower than the random number of Block_A (e.g., that 12345, or Rand_B, is less than 54321, or Rand_A). In some embodiments, some other comparison, logic, function, etc. may be used by each node 103 to determine a sequence of simultaneously recorded blocks (e.g., based on the random number included in the blocks and/or based on other factors).

For example, in some embodiments, in addition to or in lieu of determining the sequence based on a value included in the blocks (e.g., the random number or other suitable value), nodes 103 may generate respective value based on the contents of the blocks (e.g., the header of the blocks and/or the payload of the blocks). For example, for each simultaneously received block (e.g., blocks received that both reference the same "last block" and are received within a threshold time of each other and/or otherwise before such blocks are committed to distributed ledger 101), each node 103 may compute a hash value (and/or may derive or compute some other value) of the header and/or payload of the blocks, and may use such computed value(s) to determine a sequence of the simultaneously received blocks.

Figure 3:
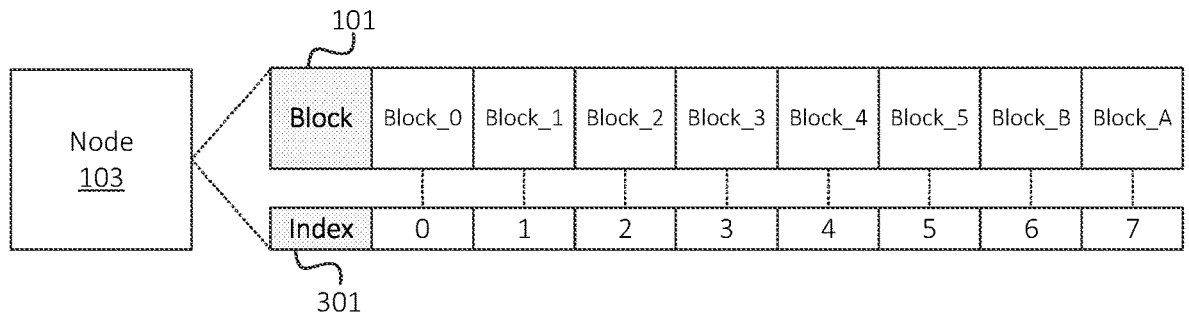
FIG. 3 illustrates example sequence information which may be used to indicate a sequence of blocks associated with a distributed ledger, in accordance with some embodiments.

As shown in FIG. 3, each node 103 may maintain the blocks of distributed ledger 101, as well as sequence information 301 indicating a sequence of each block. Sequence information 301 may be, or may include, metadata associated with distributed ledger 101 that is not included within distributed ledger 101 itself (e.g., is not included within blocks of distributed ledger 101). Sequence information 301 may indicate an index, position, etc. of each block associated with distributed ledger 101. In situations where no blocks of distributed ledger 101 have been received simultaneously, sequence information 301 may indicate the same sequence as are indicated in the blocks themselves (e.g., the "last block" of each block refers to the preceding block, with no ambiguities or duplicate references to the same "last block"). On the other hand, in situations where two or more blocks of distributed ledger 101 have been received simultaneously, sequence information 301 may be used to resolve ambiguities or duplicate references to the same "last block." For example, as shown in the figure, Block_B may be at index 6 (e.g., immediately after Block_5 in the sequence, as discussed above with respect to FIG. 2), and Block_A may be at index 7 (e.g., immediately after Block_B in the sequence). Thus, although Block_A and Block_B both reference Block_5 as their "last block," each node 103 associated with distributed ledger 101 may determine that Block_B succeeds Block_5, and that Block_A succeeds Block_B. That is, although FIG. 3 illustrates sequence information 301 as maintained by one node 103, all nodes 103 associated with distributed ledger 101 may determine the same sequence information 301, and may accordingly all maintain information indicating the same sequence of the blocks of distributed ledger 101.

Thus, in situations where a given node 103 uses the entire distributed ledger 101 (e.g., such as when calculating a hash of distributed ledger 101, when providing the entire distributed ledger 101 to another node 103 that is being instantiated or recovered, and/or in other situations), the entire distributed ledger 101 may be used according to the sequence indicated in sequence information 301. In contrast, if nodes 103 did not maintain the same sequence of blocks, then calculating the hash of the entire distributed ledger 101 (and/or other operations performed on the entire distributed ledger 101) may fail, such as resulting in a mismatch with hashes computed by other nodes 103. As such, each node 103 determining and maintaining the same sequence information 301 for distributed ledger 101 may maintain the distributed nature of distributed ledger 101 (e.g., the same information stored by each node 103), while allowing for multiple simultaneously proposed blocks to be recorded to distributed ledger 101.

Figure 4:
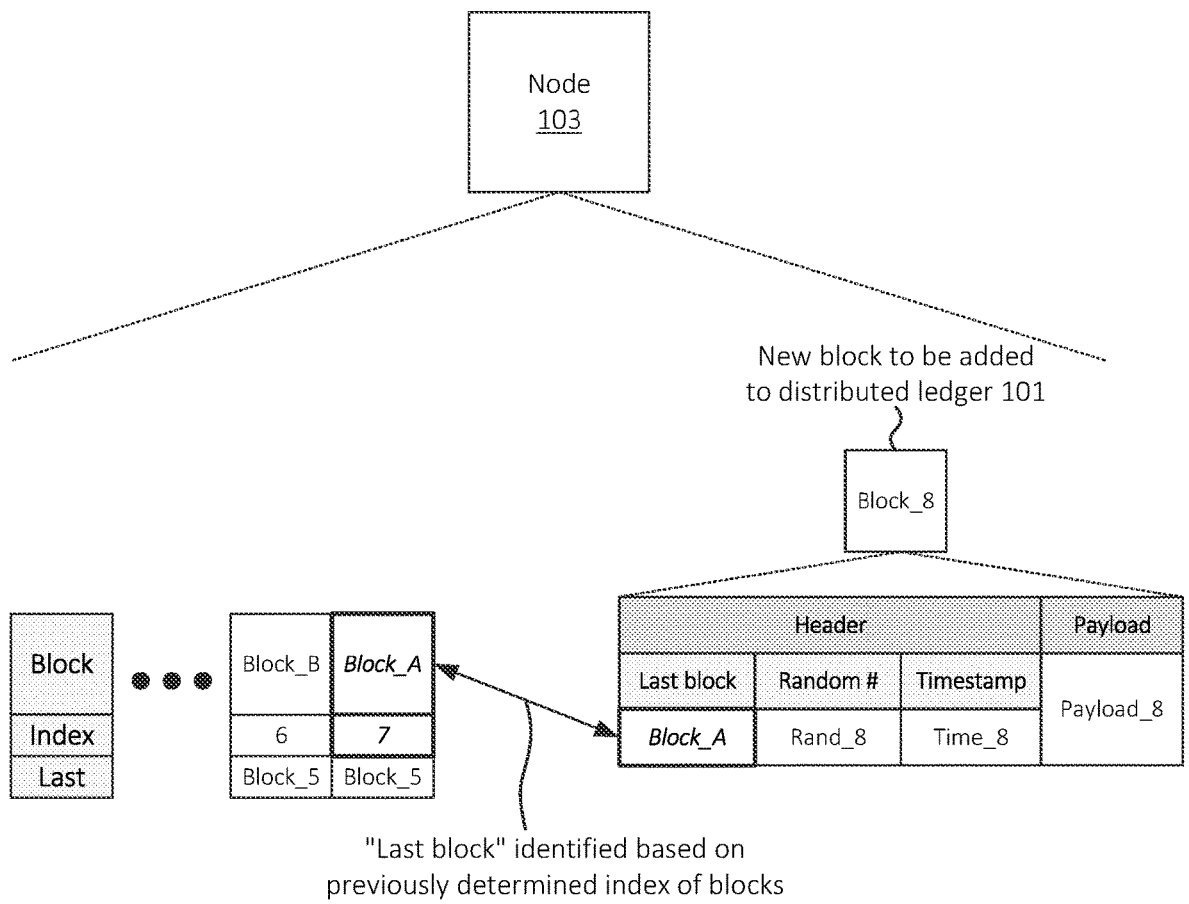
FIGS. 4 and 5 illustrate an example of adding an additional block to the distributed ledger based on the sequence information, in accordance with some embodiments.
Figure 5:
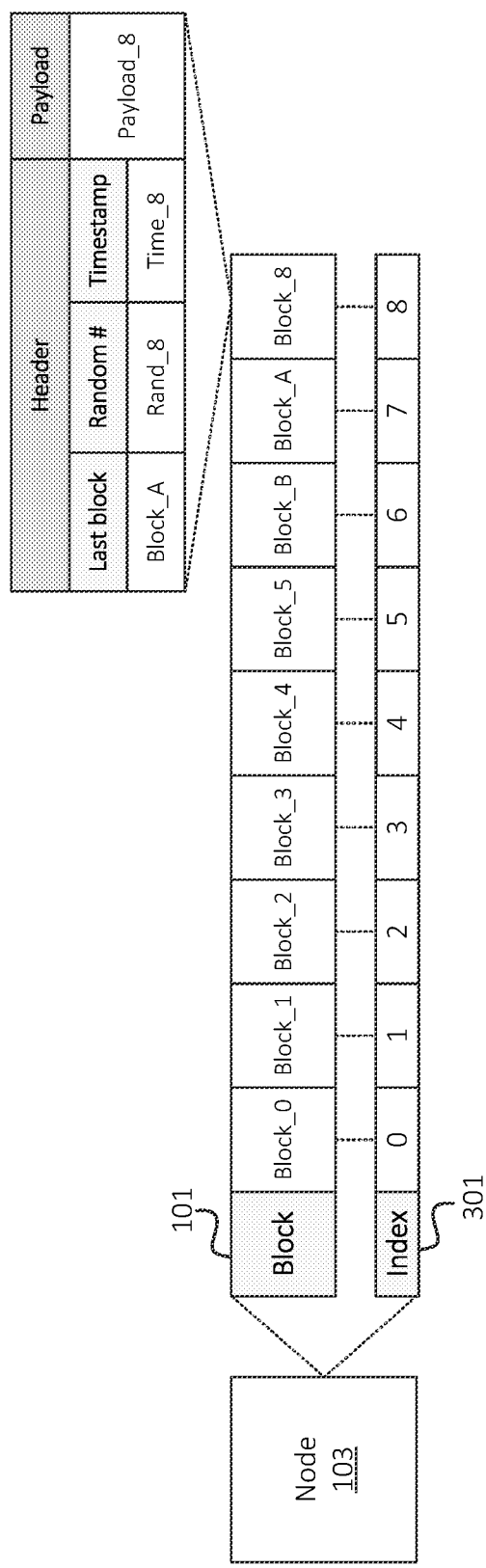

Further, sequence information 301 may be used when generating new blocks to add to distributed ledger 101. For example, as shown in FIG. 4, a particular node 103 may generate Block_8 to be added to distributed ledger 101, after Block_A and Block_B have been added. Node 103 may set the "last block" of Block_8 to Block_A, as Block_A is the last block in sequence information 301. As shown in FIG. 5, assuming that Block_8 is not simultaneously proposed with any other block, nodes 103 associated with distributed ledger 101 may add Block_8 to distributed ledger 101 and may further include information in sequence information 301 indicating the Block_8 is at index 8 (e.g., immediately after Block_A).

Figure 6A:
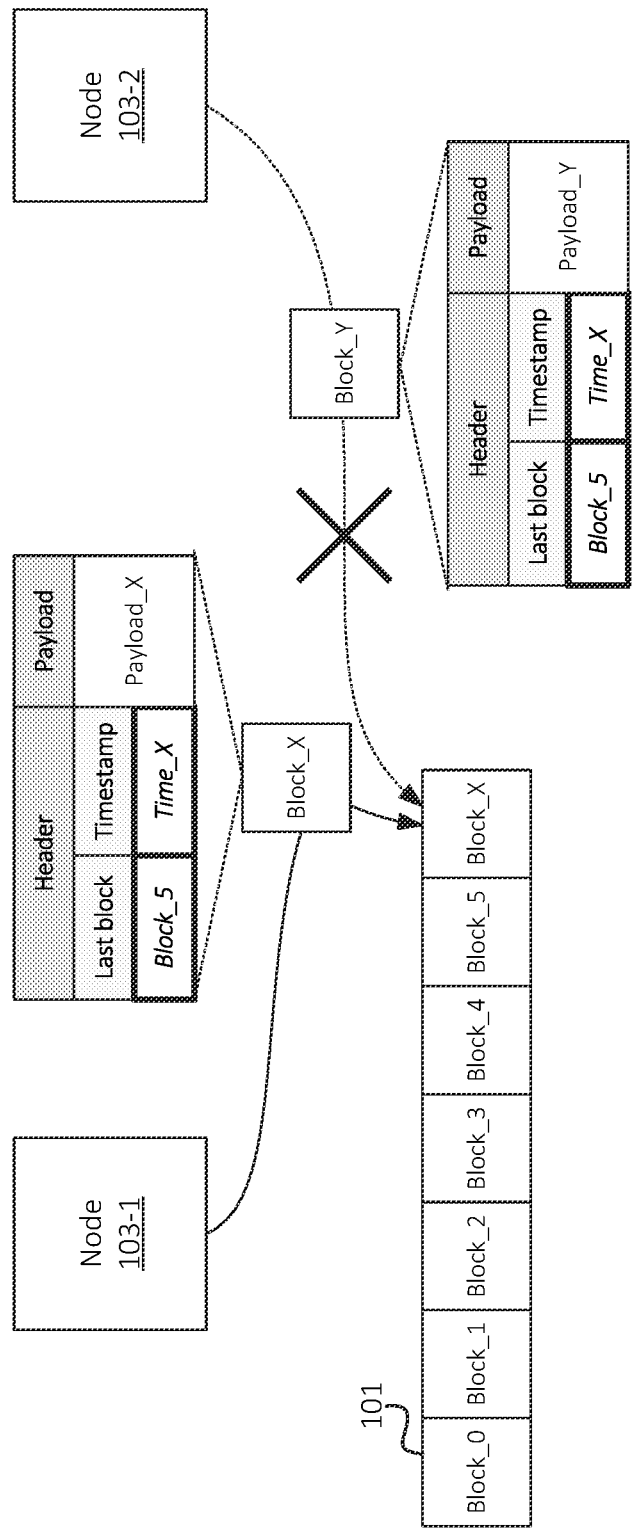
FIGS. 6A and 6B illustrate examples of issues that may occur when multiple blocks are be proposed simultaneously for recordation to a distributed ledger, in the absence of the sequence information of some embodiments.
Figure 6B:
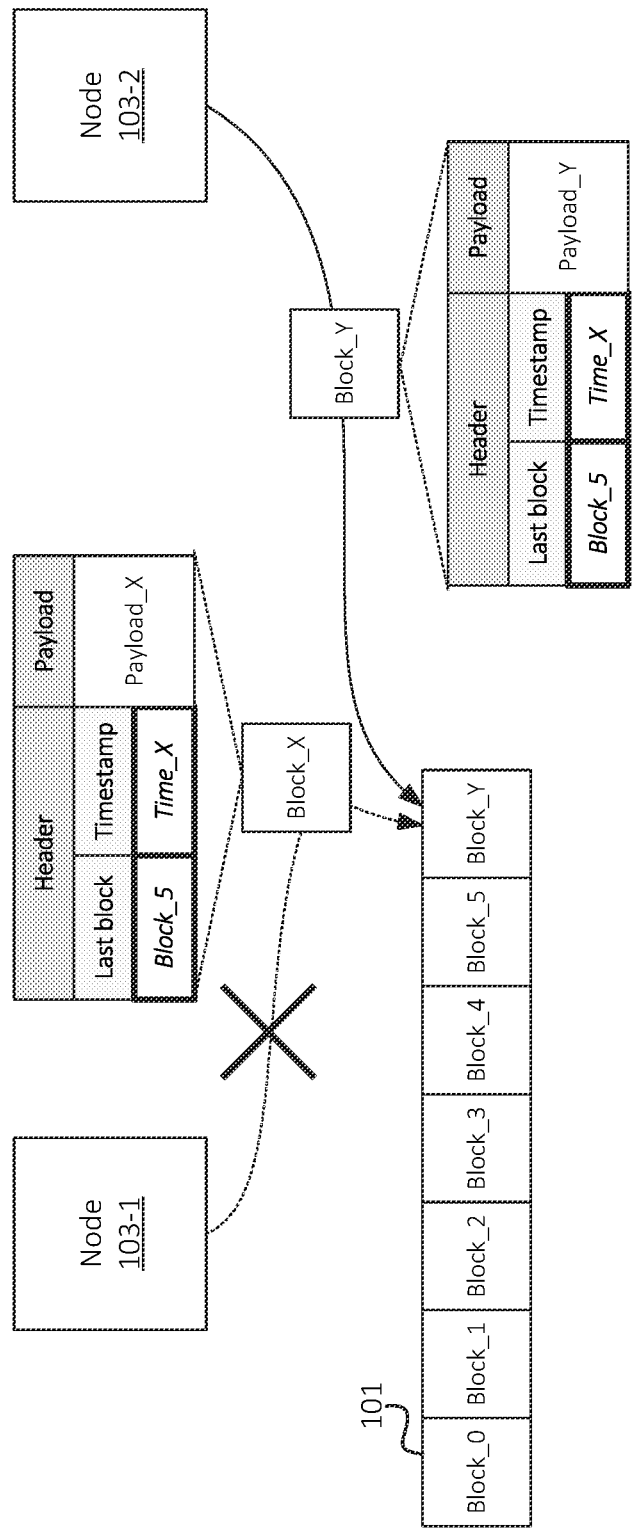

FIGS. 6A and 6B illustrate examples of how simultaneously proposed blocks may be treated in the absence of one or more features described above. For example, as shown in FIG. 6A, Block_X and Block_Y may both be simultaneously proposed (e.g., at Time_X, and/or may otherwise be proposed before either block is committed to distributed ledger 101). In this example, Block_X and Block_Y may not include a random number, and may instead only include a reference to Block_5 as their "last block." The simultaneous proposal of these blocks may result in a race condition, in which the first block to be committed to distributed ledger 101 (e.g., by a consensus of nodes 103, such as a majority, a quorum, a threshold quantity of nodes, etc.) may be added to distributed ledger 101 while the other block is rejected (e.g., not added to distributed ledger 101). In FIG. 6A, Block_X may be added to distributed ledger 101 based on this race condition. Since Block_X has been added, then the reference to Block_5 as the "last block" of Block_Y may become invalid, and Block_Y may be rejected. In other scenarios, as shown in FIG. 6B, Block_Y may be added to distributed ledger 101 based on the race condition and, since Block_Y has been added, then the reference to Block_5 as the "last block" of Block_X may become invalid and Block_X may be rejected. Thus, the embodiments described herein (e.g., with respect to FIGS. 1-5) may mitigate or avoid the race condition described above.

Figure 7:
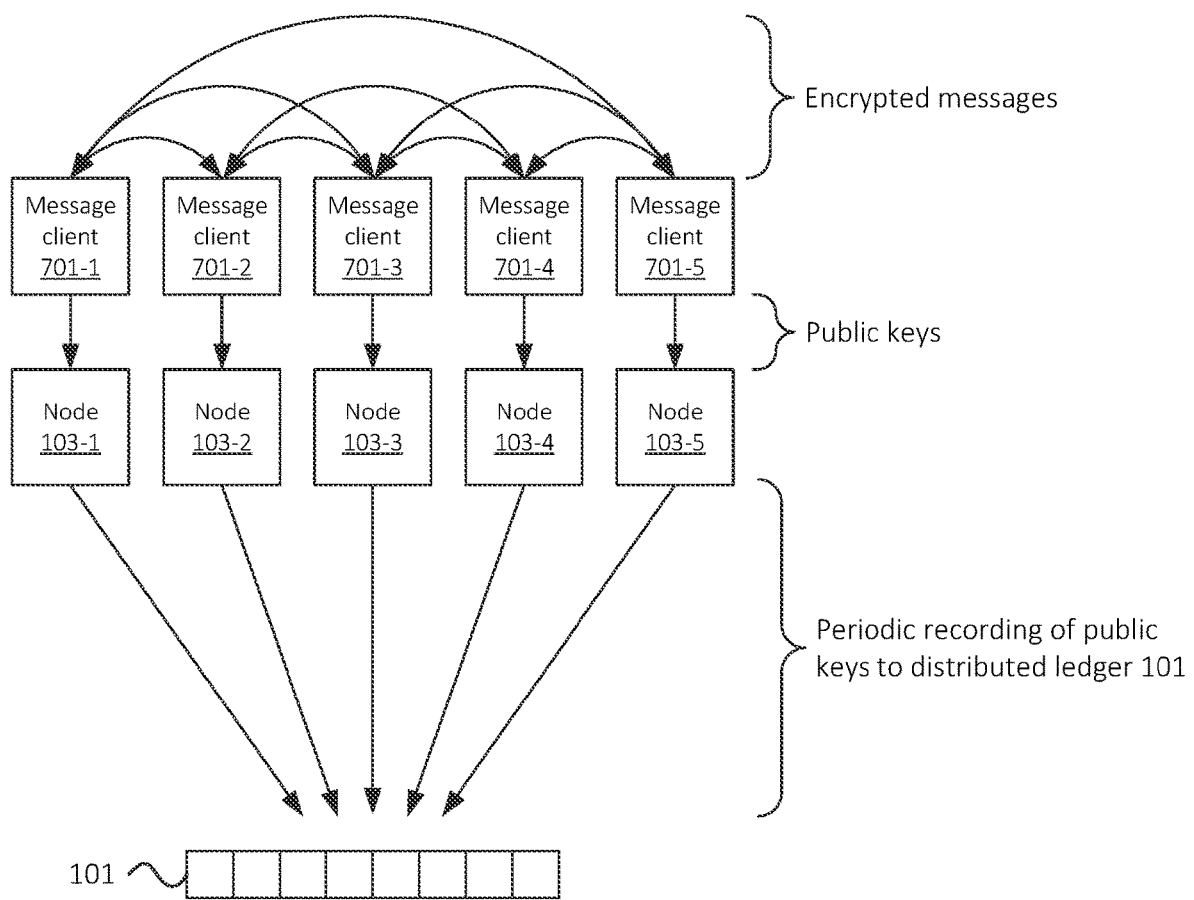
FIG. 7 illustrates an example situation in which multiple blocks may be proposed simultaneously for recordation to a distributed ledger.

In some embodiments, the multiple simultaneous proposal, recordation, etc. of blocks may be used in conjunction with a secure messaging technique that utilizes distributed ledger 101 for the distribution, exchange, etc. of public keys that may be used in the secure messaging technique. For example, as shown in FIG. 7, a set of five nodes 103-1 through 103-5 may be associated with participants in a group messaging session in which encrypted messages may be sent between one or more message clients 701-1 through 701-5. In some embodiments, each one of nodes 103-1 through 103-5 may be associated with a particular respective message client 701. For example, node 103-1 and message client 701-1 may be executed by, communicatively coupled to, and/or otherwise associated with the same UE or other type of device. Similarly, node 103-2 and message client 701-2 may be executed by, communicatively coupled to, and/or otherwise associated with the same UE or other type of device, and so on. In some embodiments, nodes 103 and respective message clients 701 may communicate via an application programming interface ("API") or other suitable communication pathway.

As discussed below, message clients 701 may encrypt messages, such as chat messages, instant messages, text messages, video messages, or the like, and may send the encrypted messages to one or more recipients (e.g., some or all of the other message clients 701). The encrypted messages may be associated with one or more keys that are recorded to distributed ledger 101, as discussed below. The recipient message clients 701 may receive the encrypted messages and may use appropriate keys recorded to distributed ledger 101 in order to decrypt the messages. In some embodiments, nodes 103 may periodically, intermittently, and/or on some other basis "refresh" the keys recorded distributed ledger 101. In some scenarios, multiple (e.g., all) nodes 103 may refresh their respective keys simultaneously. As discussed above, proposed blocks that include these new keys may include a random number that is used by nodes 103 to sequence the blocks in the same manner as each other, thus maintaining the same sequence of distributed ledger 101 while also allowing the blocks to be proposed simultaneously.

Figure 8:
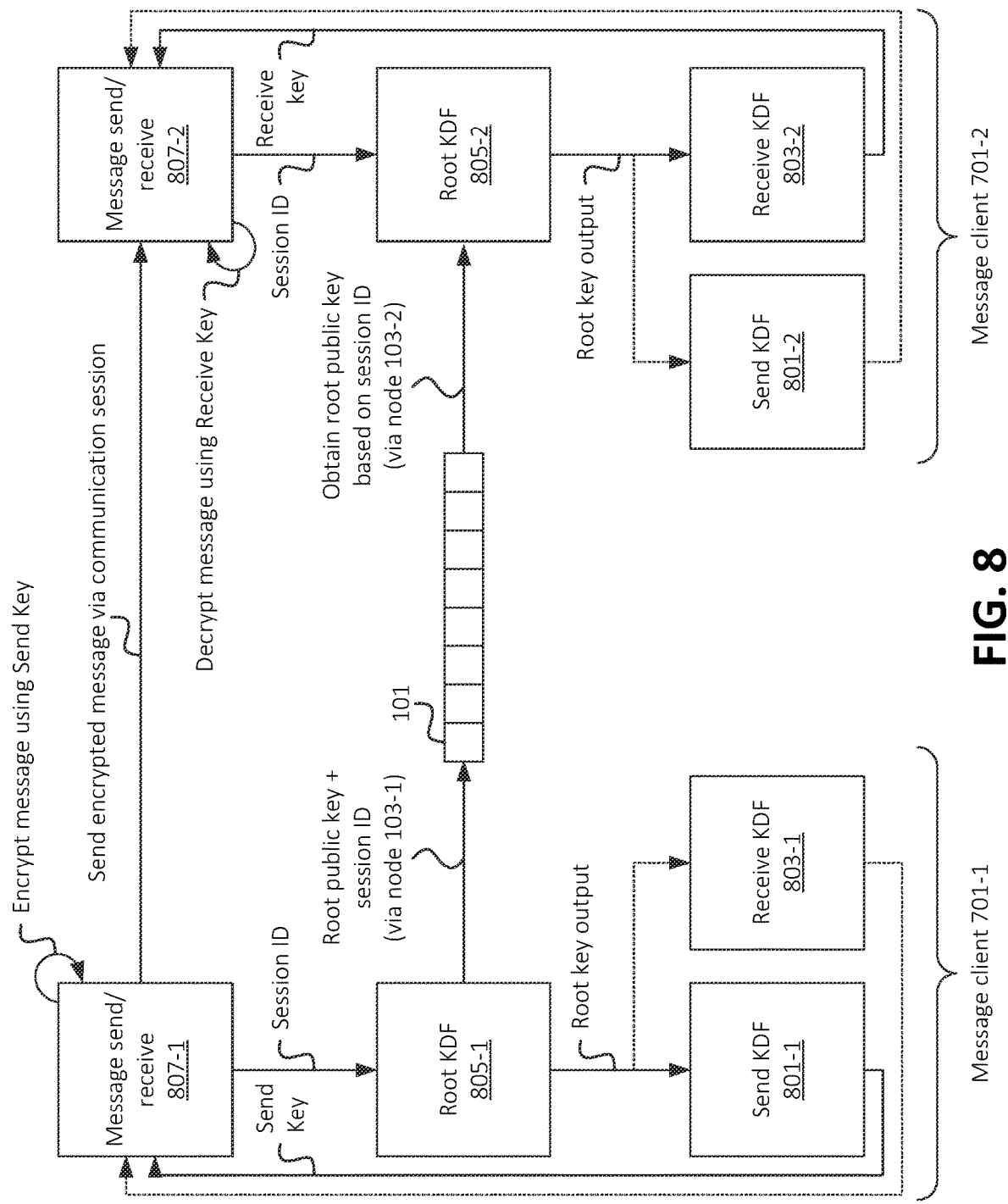
FIG. 8 illustrates an example secure messaging technique with key distribution via a distributed ledger, in accordance with some embodiments.

FIG. 8 illustrates an example of using a shared public key (e.g., shared via distributed ledger 101, in accordance with some embodiments) in a secure communication technique (e.g., a double ratchet technique) to secure communications between message client 701-1 and 701-2. For example, message client 701-1 may encrypt communications and may send (e.g., via message send/receive component 807-1) the encrypted communications to message client 701-2 (e.g., to message send/receive component 807-2). Message client 701-2 may receive encrypted communications from message client 701-1, may decrypt the communications based on techniques described herein, and may present the decrypted communications (e.g., via a graphical user interface ("GUI") or other suitable manner of presentation). Similarly, message client 701-2 (e.g., message send/receive component 807-2) may encrypt communications, and may send the encrypted communications to message client 701-1 (e.g., to message send/receive component 807-1). Message client 701-1 may receive encrypted communications from message client 701-2, may decrypt the communications, and may present the decrypted communications (e.g., via a GUI or other suitable manner of presentation).

The encryption and/or decryption by message client 701-1 and/or message client 701-2 may be performed using a symmetric key that is generated based on a double ratchet technique, a Signal Protocol technique, and/or other suitable technique. For example, as discussed herein, the symmetric key may be used by a sender (e.g., message client 701-1, in this example) to encrypt a communication, and may be used by a recipient (e.g., message client 701-2, in this example) to decrypt the communication. The symmetric keys may be generated by respective Send Key Derivation Function ("KDF") 801 and/or Receive KDF 803 associated with the sender and/or recipient. The symmetric keys may be generated based on one or more root keys provided by Root KDF 805 to Send KDF 801 and/or Receive KDF 803. For example, Root KDF 805-1 may provide a root key output based on a public key and a private key to Send KDF 801-1, which may generate a send key (e.g., based on the root key output and one or more private keys)s which may be used to encrypt communications to be sent by message client 701-1. The private key based on which the root key output is generated may be privately maintained by message client 701-1 (e.g., not sent to message client 701-2), while the public key may be shared with message client 701-2 via distributed ledger 101, in accordance with embodiments described herein. Root KDF 805-1 may provide a different root key output for each message sent and/or received by message client 701-1, based on a public key exchange (e.g., via a Diffie-Hellman key exchange or other suitable procedure) with message client 701-2, which may be performed each time a message is sent by message client 701-1 and/or message client 701-2.

For example, when message client 701-1 sends a message, Root KDF 805-1 may generate a root key output, and may further output a public key based on which the root key output was generated, to distributed ledger 101 (e.g., may instruct node 103-1 to record a block to distributed ledger 101 that includes the public key as a payload of the block). As discussed above, the public key may be provided with a session identifier (e.g., to identify a communication session between message client 701-1 and message client 701-2), an identifier associated with message client 701-1, an identifier associated with message client 701-2, and/or other suitable information based on which message client 701-2 may identify that the public key recorded to distributed ledger 101 is associated with the communication session between message client 701-1 and message client 701-2.

Message client 701-2 (e.g., Root KDF 805-2) may obtain the root public key from distributed ledger 101 based on the session identifier or other suitable identifier, and may generate a root key output based on the obtained public key and a private key (e.g., a different private key than the private key used by Root KDF 805-1 to encrypt the communication). Using distributed ledger 101 to exchange public keys may maintain the integrity of the keys, such as by preventing malicious actors from modifying or "spoofing" keys. Further, using distributed ledger 101 may aid in situations where a given message client 701 (e.g., message client 701-2, in this example) is "offline" or is otherwise unavailable to receive public keys from another message client 701 (e.g., message client 701-1, in this example) at the time that the other message client 701 outputs the public keys.

Root KDF 805-2 may provide the root key output to Receive KDF 803-2, which may generate a receive key based on the root key output and one or more private keys. In accordance with the double ratchet techniques, Signal Protocol techniques, etc., the receive key generated by Receive KDF 803-2 may be the same as the send key output generated by Send KDF 801-1. In this manner, these respective send and receive keys may be an identical symmetric key that may be used to encrypt and decrypt communications, such as the encrypted communication sent by message client 701-1 to message client 701-2 in this example.

While an example is provided here in the context of message client 701-1 encrypting a communication, sending the encrypted communication to message client 701-2, and message client 701-2 decrypting the communication, similar techniques may be performed (e.g., iteratively) for communications encrypted and sent by message client 701-2 to message client 701-1, as denoted by the dashed lines in FIG. 8. For example, Root KDF 805-2 may generate a root key pair, output (e.g., via node 103-2) a public key of the root key pair to distributed ledger 101 for retrieval by message client 701-1, generate a root key output based on the root key pair, and provide the root key output to Send KDF 801-2. Send KDF 801-2 may generate a send key based on the root key output and one or more private keys, and message client 701-2 may encrypt a communication based on the send key. Further, Root KDF 805-1 may retrieve (e.g., via node 103-2) the public key from distributed ledger 101, generate a root key output based on the retrieved public key and one or more private keys, and provide the root key output to Receive KDF 803-1. Receive KDF 803-1 may generate a receive key based on the root key output and one or more private keys, and message client 701-1 may decrypt a communication received from message client 701-2, as encrypted based on a matching send key.

Figure 9:
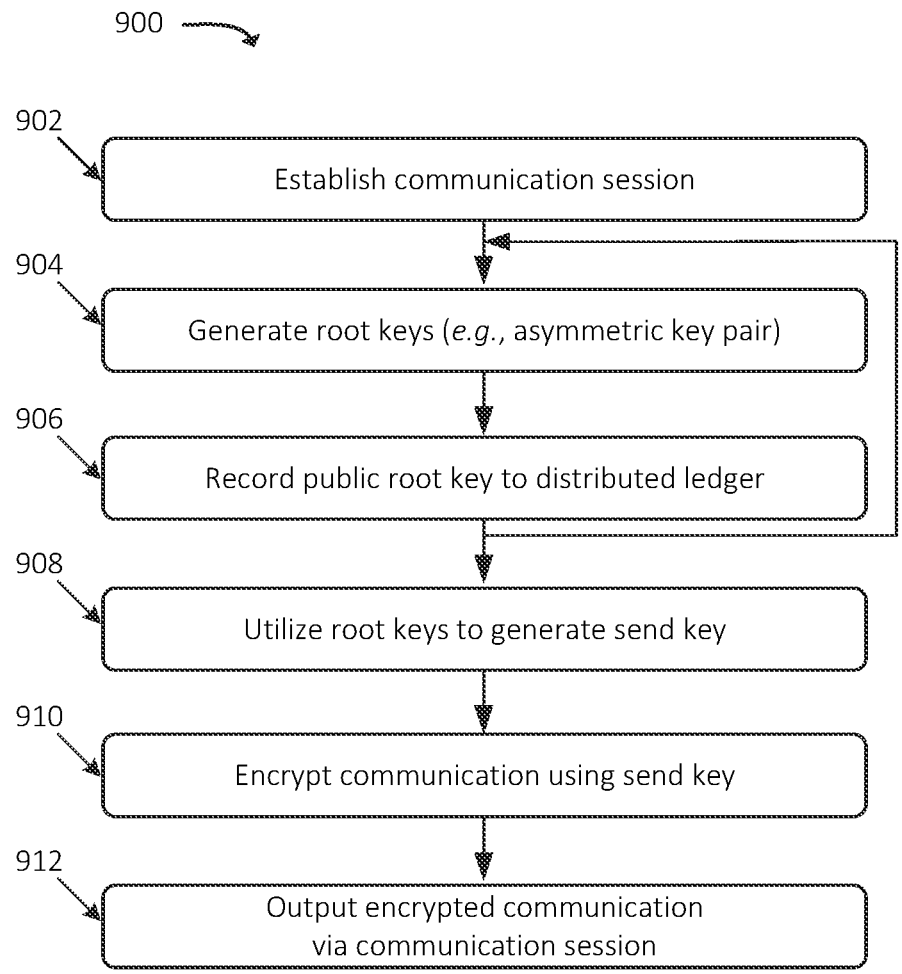
FIGS. 9 and 10 illustrate example processes for a secure messaging technique with key distribution via a distributed ledger, in accordance with some embodiments
Figure 10:
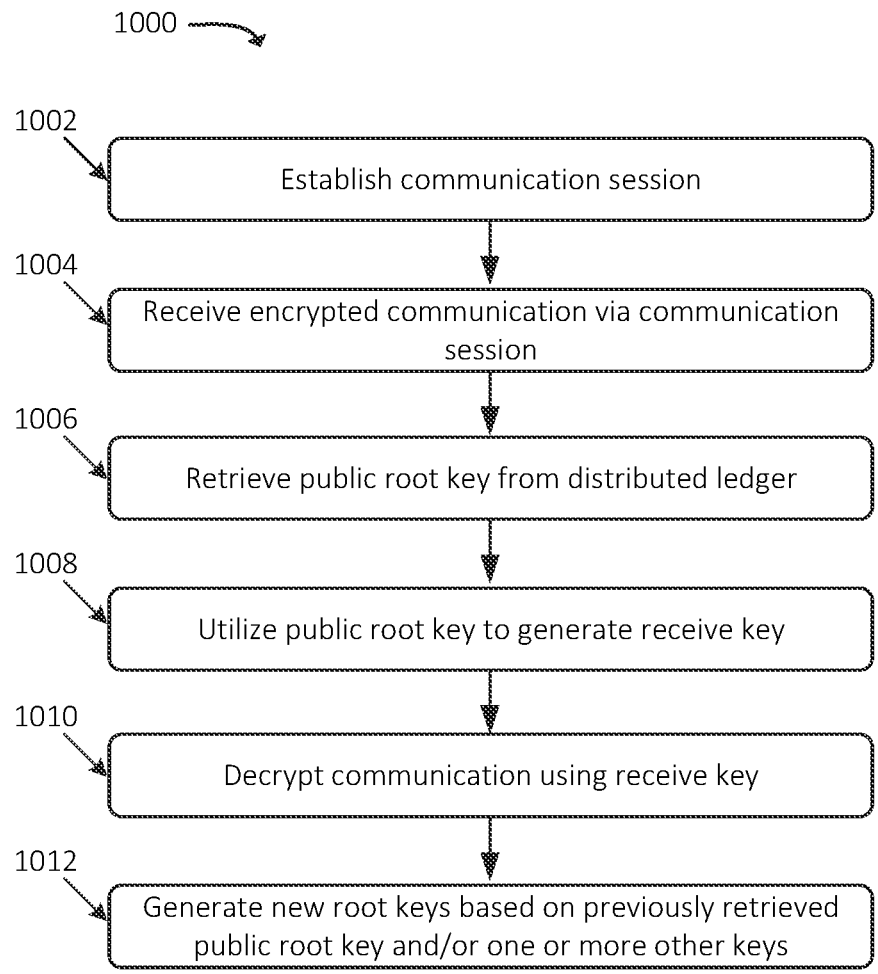

FIGS. 9 and 10 illustrate example processes 900 and 1000, respectively, for utilizing distributed ledger techniques to share and/or exchange public keys. In the examples provided herein, the key exchange may be part of a Diffie-Hellman key exchange, a key exchange portion of a Signal Protocol technique, a key exchange portion of a double ratchet technique, and/or some other suitable secure exchange of public keys. In some embodiments, some or all of processes 900 and/or 1000 may be performed by one or more message clients 701 and/or nodes 103 (e.g., UEs that include, execute, and/or are otherwise associated with message clients 701 and/or nodes 103), such as message clients 701 that are engaged in a communication session with each other.

As shown, process 900 may include establishing (at 902) a communication session with one or more message clients 701. The communication session may be associated with a session identifier or other identifier based on which message clients 701 that are participants of the communication session may identify messages exchanged with one another and/or public keys, associated with the communication session, recorded to distributed ledger 101 in accordance with embodiments described herein.

Process 900 may further include generating (at 904) a set of root keys, which may include an asymmetric key pair. For example, as discussed above, the root keys may include a private key which may be maintained securely by message client 701, and a public key which may ultimately be shared with one or more other message clients 701 (e.g., another participant in the communication session).

Process 900 may additionally include recording (at 906) the public root key (e.g., the public key of the asymmetric key pair generated at 904) to distributed ledger 101. For example, message client 701 may output the public key to distributed ledger 101, and distributed ledger 101 may be used to propagate the information to one or more nodes 103 of distributed ledger 101. Nodes 103 may form a consensus regarding the addition of the provided public key to one or more records of distributed ledger 101, and may maintain an immutable record of the provided public key. In some embodiments, the record may include a timestamp, a block identifier, and/or other mechanism by which a recency or age of the record may be determined. As similarly described above, the record may further include a communication session identifier, an identifier of message client 701 from which the information was received, and/or other suitable information.

As discussed above, in some embodiments, message client 701 may periodically, intermittently, and/or on some other basis, generate (at 904) a new root key and record (at 906) the public root key to distributed ledger 101. For example, message client 701 may periodically "refresh" its keys to maintain security of the messaging session, to keep the keys near the end of the sequence of distributed ledger 101 (e.g., in order to avoid removal of the keys in instances where older records of distributed ledger 101 are archived or removed), and/or for other reasons.

Process 900 may also include utilizing (at 908) the root keys to generate a send key. For example, as discussed above, Root KDF 805 may utilize the root keys (e.g., including the root public key, as well as the root private key and/or one or more other keys) to generate a root key output, and may provide the root key output to another KDF, such as Send KDF 801. Send KDF 801 may generate a send key based on the root key output from Root KDF 805 and/or based on one or more other keys or functions. As discussed above, the generated send key may be a symmetric key that may be identical to a receive key generated by a recipient of the public key, based on a Signal Protocol technique, a double ratchet technique, etc.

Process 900 may further include encrypting (at 910) a communication using the send key. Process 900 may additionally include outputting (at 912) the encrypted communication via the communication session, such as to a message client 701 with which the communication session was established (at 902).

As shown in FIG. 10, process 1000 may include establishing (at 1002) a communication session. For example, as similarly discussed above, message client 701 may establish a communication session with one or more other message clients 701. The communication session may be associated with a suitable identifier, based on which the message clients 701 participating in the communication session may identify communications associated with the communication session, including encrypted messages, public keys, and/or other information.

Process 1000 may further include receiving (at 1004) an encrypted communication via the communication session. For example, the communication may have been encrypted using one or more KDFs, where the input to the one or more KDFs include the public root key and one or more other keys (e.g., one or more private keys, one or more KDF outputs, etc.).

Process 1000 may further include retrieving (at 1006) a public root key from distributed ledger 101. In some embodiments, distributed ledger 101 and/or one or more devices or systems communicatively coupled to distributed ledger 101 may "push" the public root key to distributed ledger 101. For example, the one or more devices or systems may identify a particular block that includes an identifier of message client 701 (e.g., where the particular block includes the identifier of message client 701 and a public root key), may identify a particular block that includes an identifier of the communication session (e.g., where the particular block includes the identifier of the communication session and a public root key), etc. Additionally, or alternatively, message client 701 may "pull" the information from distributed ledger 101 based on a suitable identifier (e.g., an identifier of message client 701, an identifier of the communication session, etc.).

Process 1000 may additionally include utilizing (at 1008) the public root key to generate a receive key. For example, as discussed above, message client 701 may utilize one or more KDFs, such as Root KDF 805 and/or Receive KDF 803, to generate a receive key. The receive key may be a symmetric key with respect to a key used to encrypt a communication received by message client 701 via the communication session. For example, as discussed above, the receive key may be identical to a send key used by a sender of the communication, where the send key was also generated based on one or more KDFs and at least the public root key. For example, the sender and recipient message clients 701 may perform double ratchet techniques, Signal Protocol techniques, or the like, to respectively encrypt and decrypt the communication, without transmitting or sharing the symmetric key itself.

Process 1000 may further include decrypting (at 1010) the communication, received via the communication session, using the generated receive key. For example, message client 701 may apply one or more functions to decrypt the receive message using the receive key, which, as discussed above, may be the same as a send key used to encrypt the communication.

Process 1000 may additionally include generating (at 1012) a new set of root keys based on the previously retrieved public root key and one or more other root keys. For example, once message client 701 generates the receive key, the public root key (retrieved at 1006) may be discarded and/or not used for sending messages from message client 701. In some situations, message client 701 may maintain the public root key and apply techniques described above to decrypt subsequent communications from the sender in situations where the sender sends multiple communications in a row without any intervening messages from message client 701. The new set of root keys may be generated based on the receive key (generated at 1008), the public root key (retrieved at 1006), and/or one or more other suitable keys. Message client 701 may then proceed to output the newly generated public root key to distributed ledger 101, as similarly described above with respect to operation 906 of process 900, may generate (e.g., similar to operation 908) a new send key based on the newly generated public root key, etc.

Figure 11:
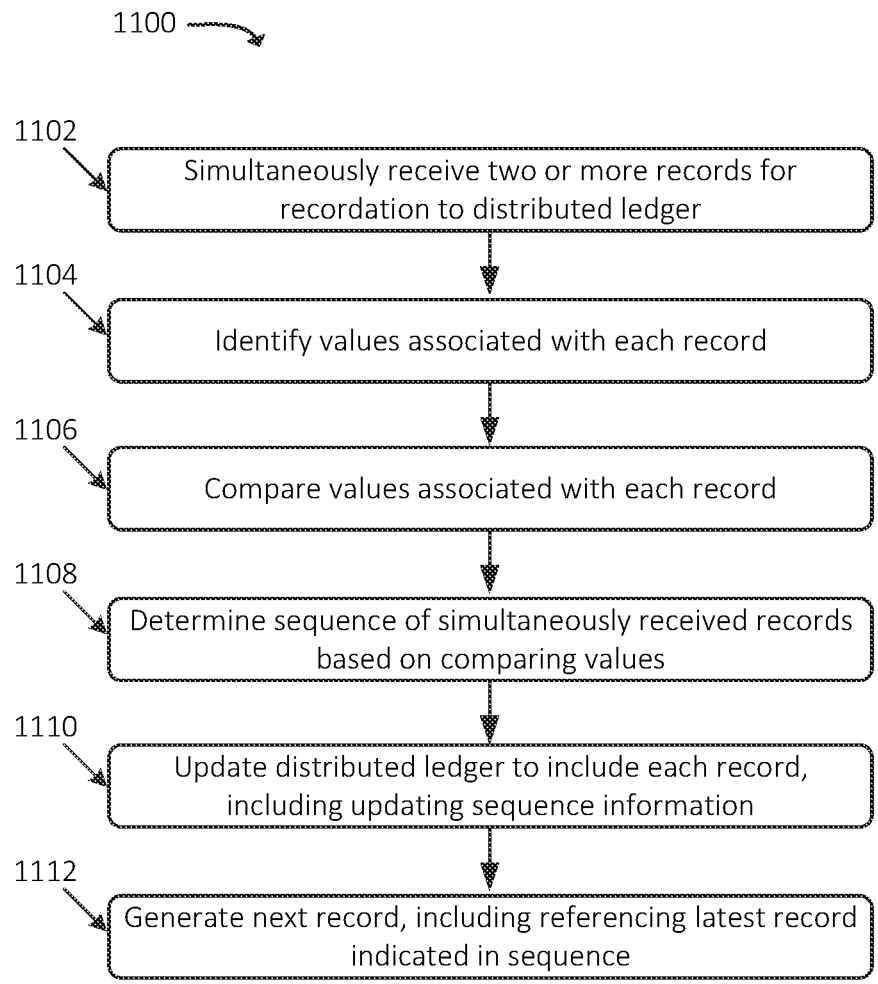
FIG. 11 illustrates an example process for recording simultaneously received blocks to a distributed ledger, in accordance with some embodiments.

FIG. 11 illustrates an example process 1100 for recording simultaneously received records (e.g., blocks) to distributed ledger 101. In some embodiments, some or all of process 1100 may be performed by node 103, which may be a particular node 103 out of a set of nodes 103 that maintain (e.g., via one or more consensus mechanisms) distributed ledger 101. As discussed above, node 103 may be, may include, may be implemented by, etc. a UE or other suitable device or system.

As shown, process 1100 may include simultaneously (at 1102) receiving two or more records (e.g., blocks) for recordation to distributed ledger 101. For example, the records may be received within a threshold amount of time of each other, such as within one second, within 20 seconds, or some other suitable threshold amount of time. Additionally, or alternatively, the records may be received before either record is committed to distributed ledger 101. In some embodiments, the records may include a reference to the same record of distributed ledger 101 (e.g., may indicate the same "last record" that has already been recorded, committed, etc. to distributed ledger 101). As discussed above, the potential ambiguity of the records (received at 1102) referencing the same record of distributed ledger 101 may be mitigated or alleviated in accordance with embodiments described herein.

Process 1100 may further include identifying (at 1104) values associated with each of the received records. For example, the received records may each include a value, such as a random or pseudorandom number. In some embodiments, the value may include or may be based on an identifier of node 103 and/or of a device that implements node 103 (e.g., an MDN, a UUID, a GUID, a hardware identifier, etc.). Additionally, or alternatively, node 103 may generate a respective value for each record, such as by applying a cryptographic hashing function to each of the received records. In some embodiments, some or all other nodes 103 that are associated with distributed ledger 101 may also identify the same values associated with the received records (e.g., may extract the same values from the records and/or may perform a cryptographic hashing function or other suitable operation to generate the values). In this manner, all nodes 103 that maintain distributed ledger 101 may identify the same values with respect to the received records, without needing to communicate with each other to identify the values.

Process 1100 may additionally include comparing (at 1106) the values associated with each record. For example, node 103 may compare to values (identified at 1104), and may determine (at 1108) a sequence of the simultaneously received records based on comparing the values. For example, node 103 may identify which value is a highest value, which value is a next highest value, and so on. In this manner, node 103 may determine the sequence of the records based on the sequence, order, ranking, etc. of the corresponding values for the records.

Process 1100 may also include updating (at 1110) distributed ledger 101 to include the received records, which may include updating sequence information associated with distributed ledger 101. For example, as discussed above, node 103 may maintain sequence information 301, indicating a sequence of records that have been added to distributed ledger 101. Sequence information 301 may indicate a sequence that would be different or unambiguous, as compared to a sequence that may be derived simply from determining the references to other records included in records of distributed ledger 101. For example, as discussed above, multiple simultaneously received records may refer to the same record of distributed ledger 101. Sequence information 301, as maintained by all nodes 103 associated with distributed ledger 101, may therefore indicate the same sequence of records such that the potential ambiguity of the references to the same record is alleviated.

Process 1100 may further include generating (at 1112) a next record for recordation to distributed ledger 101. For example, after the records (received at 1102) are committed, recorded, etc. to distributed ledger 101, node 103 may generate a subsequent record for recordation to distributed ledger 101. When generating the subsequent record, node 103 may identify a last, latest, newest, etc. record of distributed ledger 101. Node 103 may, in some embodiments, utilize sequence information 301 to identify the "last" record of the newly generated record, and may include a reference to such "last" record in the newly generated record.

Figure 12:
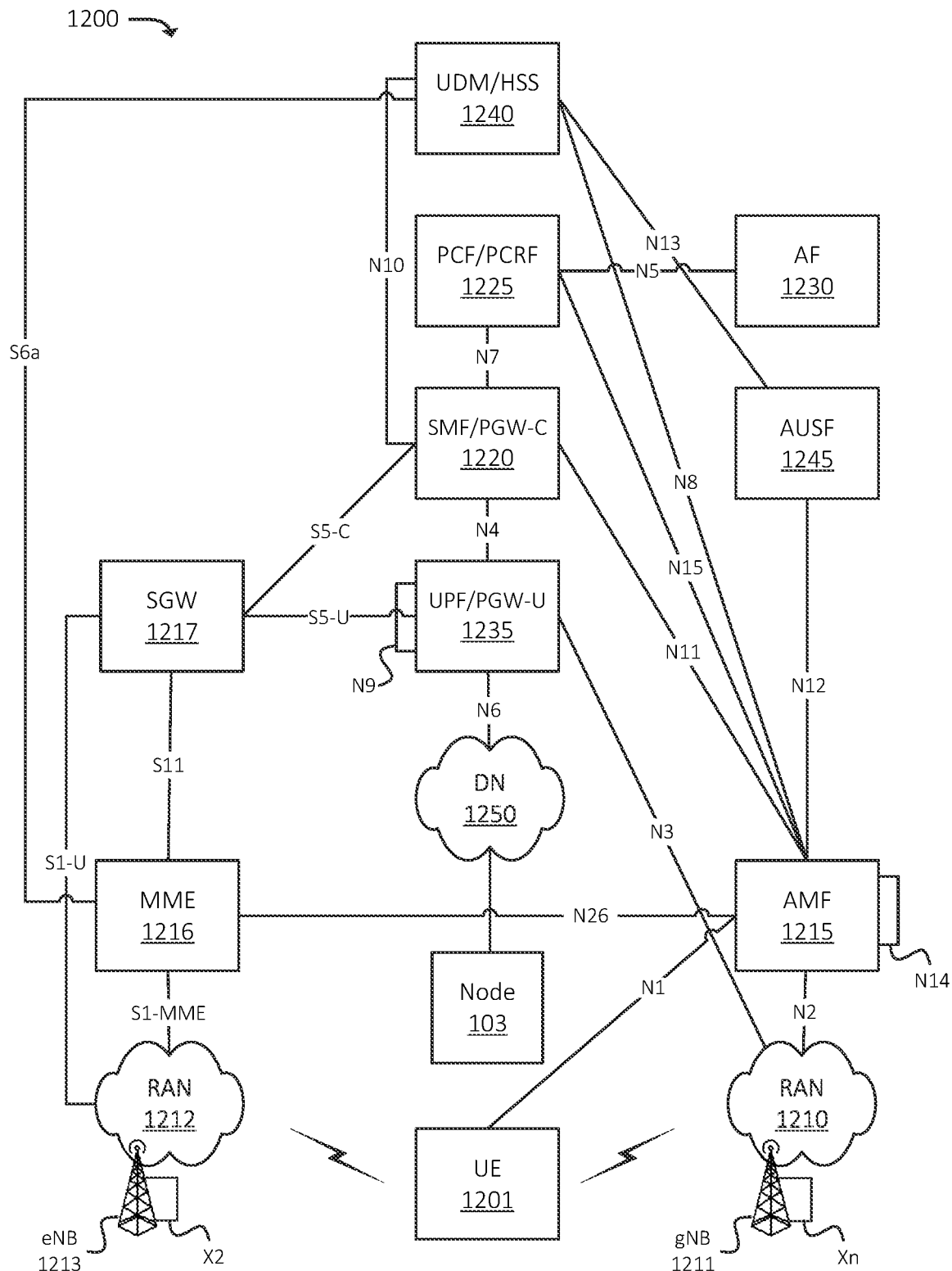
FIG. 12 illustrates an example environment in which one or more embodiments, described herein, may be implemented.

FIG. 12 illustrates an example environment 1200, in which one or more embodiments may be implemented. In some embodiments, environment 1200 may correspond to a Fifth Generation ("5G") network, and/or may include elements of a 5G network. In some embodiments, environment 1200 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1200 may represent or may include a 5G core ("5GC"). As shown, environment 1200 may include UE 1201, RAN 1210 (which may include one or more Next Generation Node Bs ("gNBs") 1211), RAN 1212 (which may include one or more evolved Node Bs ("eNBs") 1213), and various network functions such as Access and Mobility Management Function ("AMF") 1215, Mobility Management Entity ("MME") 1216, Serving Gateway ("SGW") 1217, Session Management Function ("SMF")/Packet Data Network ("PDN") Gateway ("PGW")-Control plane function ("PGW-C") 1220, Policy Control Function ("PCF")/Policy Charging and Rules Function ("PCRF") 1225, Application Function ("AF") 1230, User Plane Function ("UPF")/PGW-User plane function ("PGW-U") 1235, Unified Data Management ("UDM")/Home Subscriber Server ("HSS") 1240, and Authentication Server Function ("AUSF") 1245. Environment 1200 may also include one or more networks, such as Data Network ("DN") 1250. Environment 1200 may include one or more additional devices or systems communicatively coupled to one or more networks (e.g., DN 1250).

The example shown in FIG. 12 illustrates one instance of each network component or function (e.g., one instance of SMF/PGW-C 1220, PCF/PCRF 1225, UPF/PGW-U 1235, UDM/HSS 1240, and/or AUSF 1245). In practice, environment 1200 may include multiple instances of such components or functions. For example, in some embodiments, environment 1200 may include multiple "slices" of a core network, where each slice includes a discrete and/or logical set of network functions (e.g., one slice may include a first instance of SMF/PGW-C 1220, PCF/PCRF 1225, UPF/PGW-U 1235, UDM/HSS 1240, and/or AUSF 1245, while another slice may include a second instance of SMF/PGW-C 1220, PCF/PCRF 1225, UPF/PGW-U 1235, UDM/HSS 1240, and/or AUSF 1245). The different slices may provide differentiated levels of service, such as service in accordance with different Quality of Service ("QoS") parameters.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. Alternatively, or additionally, one or more of the devices of environment 1200 may perform one or more network functions described as being performed by another one or more of the devices of environment 1200. Devices of environment 1200 may interconnect with each other and/or other devices via wired connections, wireless connections, or a combination of wired and wireless connections. In some implementations, one or more devices of environment 1200 may be physically integrated in, and/or may be physically attached to, one or more other devices of environment 1200.

UE 1201 may include a computation and communication device, such as a wireless mobile communication device that is capable of communicating with RAN 1210, RAN 1212, and/or DN 1250. UE 1201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 1201 may send traffic to and/or receive traffic (e.g., user plane traffic) from DN 1250 via RAN 1210, RAN 1212, and/or UPF/PGW-U 1235. In some embodiments, UE 1201 may include, may implement, may be communicatively coupled to, and/or may otherwise be associated with one or more nodes 103.

RAN 1210 may be, or may include, a 5G RAN that includes one or more base stations (e.g., one or more gNBs 1211), via which UE 1201 may communicate with one or more other elements of environment 1200. UE 1201 may communicate with RAN 1210 via an air interface (e.g., as provided by gNB 1211). For instance, RAN 1210 may receive traffic (e.g., user plane traffic such as voice call traffic, data traffic, messaging traffic, etc.) from UE 1201 via the air interface, and may communicate the traffic to UPF/PGW-U 1235 and/or one or more other devices or networks. Further, RAN 1210 may receive signaling traffic, control plane traffic, etc. from UE 1201 via the air interface, and may communicate such signaling traffic, control plane traffic, etc. to AMF 1215 and/or one or more other devices or networks. Additionally, RAN 1210 may receive traffic intended for UE 1201 (e.g., from UPF/PGW-U 1235, AMF 1215, and/or one or more other devices or networks) and may communicate the traffic to UE 1201 via the air interface.

RAN 1212 may be, or may include, a LTE RAN that includes one or more base stations (e.g., one or more eNBs 1213), via which UE 1201 may communicate with one or more other elements of environment 1200. UE 1201 may communicate with RAN 1212 via an air interface (e.g., as provided by eNB 1213). For instance, RAN 1212 may receive traffic (e.g., user plane traffic such as voice call traffic, data traffic, messaging traffic, signaling traffic, etc.) from UE 1201 via the air interface, and may communicate the traffic to UPF/PGW-U 1235 (e.g., via SGW 1217) and/or one or more other devices or networks. Further, RAN 1212 may receive signaling traffic, control plane traffic, etc. from UE 1201 via the air interface, and may communicate such signaling traffic, control plane traffic, etc. to MME 1216 and/or one or more other devices or networks. Additionally, RAN 1212 may receive traffic intended for UE 1201 (e.g., from UPF/PGW-U 1235, MME 1216, SGW 1217, and/or one or more other devices or networks) and may communicate the traffic to UE 1201 via the air interface.

AMF 1215 may include one or more devices, systems, Virtualized Network Functions ("VNFs"), Cloud-Native Network Functions ("CNFs"), etc., that perform operations to register UE 1201 with the 5G network, to establish bearer channels associated with a session with UE 1201, to hand off UE 1201 from the 5G network to another network, to hand off UE 1201 from the other network to the 5G network, manage mobility of UE 1201 between RANs 1210 and/or gNBs 1211, and/or to perform other operations. In some embodiments, the 5G network may include multiple AMFs 1215, which communicate with each other via the N14 interface (denoted in FIG. 12 by the line marked "N14" originating and terminating at AMF 1215).

MME 1216 may include one or more devices, systems, VNFs, CNFs, etc., that perform operations to register UE 1201 with the EPC, to establish bearer channels associated with a session with UE 1201, to hand off UE 1201 from the EPC to another network, to hand off UE 1201 from another network to the EPC, manage mobility of UE 1201 between RANs 1212 and/or eNBs 1213, and/or to perform other operations.

SGW 1217 may include one or more devices, systems, VNFs, CNFs, etc., that aggregate traffic received from one or more eNBs 1213 and send the aggregated traffic to an external network or device via UPF/PGW-U 1235. Additionally, SGW 1217 may aggregate traffic received from one or more UPF/PGW-Us 1235 and may send the aggregated traffic to one or more eNBs 1213. SGW 1217 may operate as an anchor for the user plane during inter-eNB handovers and as an anchor for mobility between different telecommunication networks or RANs (e.g., RANs 1210 and 1212).

SMF/PGW-C 1220 may include one or more devices, systems, VNFs, CNFs, etc., that gather, process, store, and/or provide information in a manner described herein. SMF/PGW-C 1220 may, for example, facilitate the establishment of communication sessions on behalf of UE 1201. In some embodiments, the establishment of communications sessions may be performed in accordance with one or more policies provided by PCF/PCRF 1225.

PCF/PCRF 1225 may include one or more devices, systems, VNFs, CNFs, etc., that aggregate information to and from the 5G network and/or other sources. PCF/PCRF 1225 may receive information regarding policies and/or subscriptions from one or more sources, such as subscriber databases and/or from one or more users (such as, for example, an administrator associated with PCF/PCRF 1225).

AF 1230 may include one or more devices, systems, VNFs, CNFs, etc., that receive, store, and/or provide information that may be used in determining parameters (e.g., quality of service parameters, charging parameters, or the like) for certain applications.

UPF/PGW-U 1235 may include one or more devices, systems, VNFs, CNFs, etc., that receive, store, and/or provide data (e.g., user plane data). For example, UPF/PGW-U 1235 may receive user plane data (e.g., voice call traffic, data traffic, etc.), destined for UE 1201, from DN 1250, and may forward the user plane data toward UE 1201 (e.g., via RAN 1210, SMF/PGW-C 1220, and/or one or more other devices). In some embodiments, multiple UPFs 1235 may be deployed (e.g., in different geographical locations), and the delivery of content to UE 1201 may be coordinated via the N9 interface (e.g., as denoted in FIG. 12 by the line marked "N9" originating and terminating at UPF/PGW-U 1235). Similarly, UPF/PGW-U 1235 may receive traffic from UE 1201 (e.g., via RAN 1210, RAN 1212, SMF/PGW-C 1220, and/or one or more other devices), and may forward the traffic toward DN 1250. In some embodiments, UPF/PGW-U 1235 may communicate (e.g., via the N4 interface) with SMF/PGW-C 1220, regarding user plane data processed by UPF/PGW-U 1235.

UDM/HSS 1240 and AUSF 1245 may include one or more devices, systems, VNFs, CNFs, etc., that manage, update, and/or store, in one or more memory devices associated with AUSF 1245 and/or UDM/HSS 1240, profile information associated with a subscriber. AUSF 1245 and/or UDM/HSS 1240 may perform authentication, authorization, and/or accounting operations associated with the subscriber and/or a communication session with UE 1201.

DN 1250 may include one or more wired and/or wireless networks. For example, DN 1250 may include an Internet Protocol ("IP")-based PDN, a wide area network ("WAN") such as the Internet, a private enterprise network, and/or one or more other networks. UE 1201 may communicate, through DN 1250, with data servers, other UEs 1201, and/or to other servers or applications that are coupled to DN 1250.

DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which UE 1201 may communicate.

Figure 13:
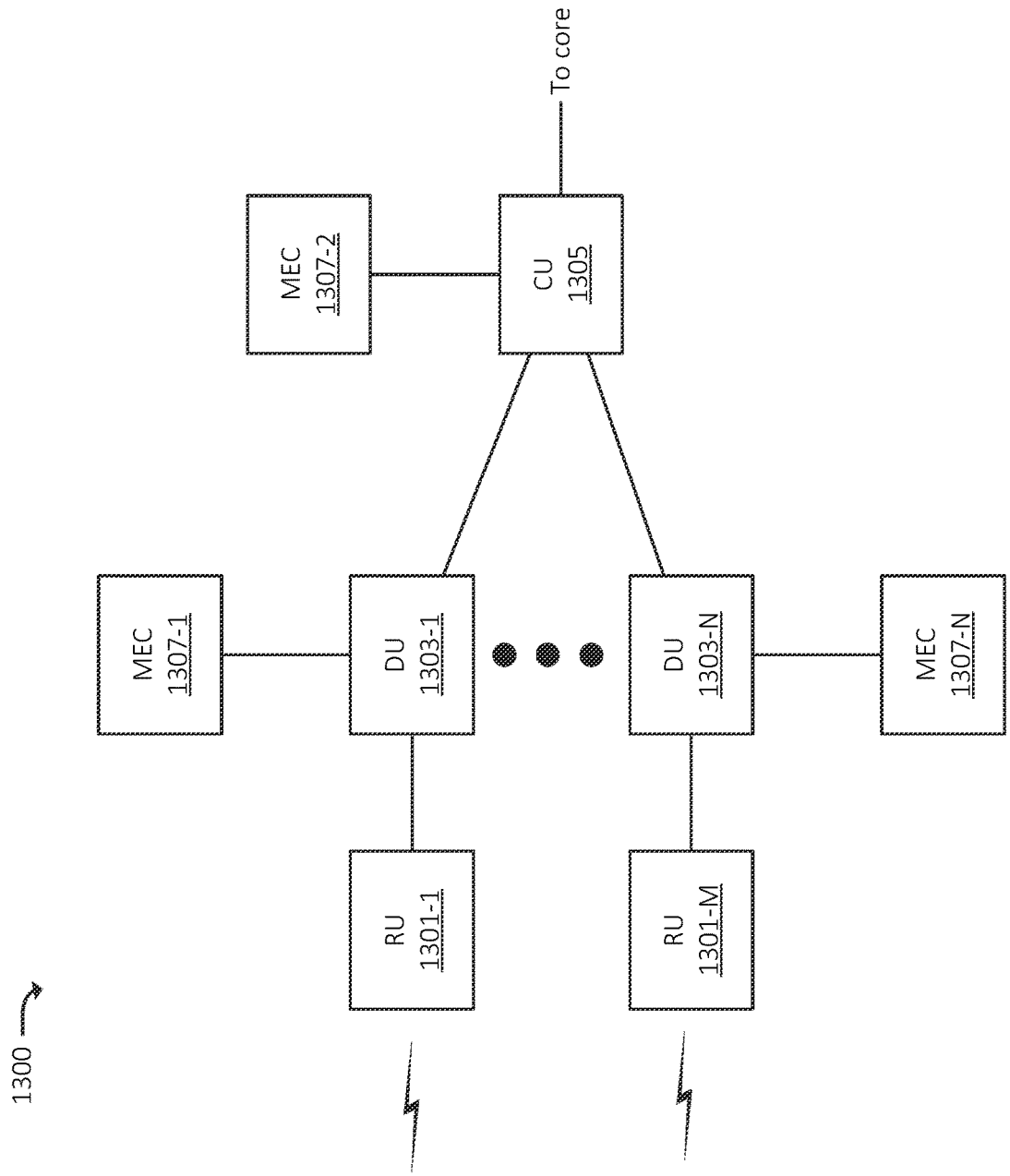
FIG. 13 illustrates an example arrangement of a radio access network ("RAN"), in accordance with some embodiments.

FIG. 13 illustrates an example RAN environment 1300, which may be included in and/or implemented by one or more RANs (e.g., RAN 1210, RAN 1212, or some other RAN). In some embodiments, a particular RAN may include one RAN environment 1300. In some embodiments, a particular RAN may include multiple RAN environments 1300. In some embodiments, RAN environment 1300 may correspond to a particular gNB 1211 of a 5G RAN (e.g., RAN 1210). In some embodiments, RAN environment 1300 may correspond to multiple gNBs 1211. In some embodiments, RAN environment 1300 may correspond to one or more other types of base stations of one or more other types of RANs. As shown, RAN environment 1300 may include Central Unit ("CU") 1305, one or more Distributed Units ("DUs") 1303-1 through 1303-5N (referred to individually as "DU 1303," or collectively as "DUs 1303"), and one or more Radio Units ("RUs") 1301-1 through 1301-M (referred to individually as "RU 1301," or collectively as "RUs 1301").

CU 1305 may communicate with a core of a wireless network (e.g., may communicate with one or more of the devices or systems described above with respect to FIG. 12, such as AMF 1215 and/or UPF/PGW-U 1235). In the uplink direction (e.g., for traffic from UEs 1201 to a core network), CU 1305 may aggregate traffic from DUs 1303, and forward the aggregated traffic to the core network. In some embodiments, CU 1305 may receive traffic according to a given protocol (e.g., Radio Link Control ("RLC")) from DUs 1303, and may perform higher-layer processing (e.g., may aggregate/process RLC packets and generate Packet Data Convergence Protocol ("PDCP") packets based on the RLC packets) on the traffic received from DUs 1303.

In accordance with some embodiments, CU 1305 may receive downlink traffic (e.g., traffic from the core network) for a particular UE 1201, and may determine which DU(s) 1303 should receive the downlink traffic. DU 1303 may include one or more devices that transmit traffic between a core network (e.g., via CU 1305) and UE 1201 (e.g., via a respective RU 1301). DU 1303 may, for example, receive traffic from RU 1301 at a first layer (e.g., physical ("PHY") layer traffic, or lower PHY layer traffic), and may process/aggregate the traffic to a second layer (e.g., upper PHY and/or RLC). DU 1303 may receive traffic from CU 1305 at the second layer, may process the traffic to the first layer, and provide the processed traffic to a respective RU 1301 for transmission to UE 1201.

RU 1301 may include hardware circuitry (e.g., one or more RF transceivers, antennas, radios, and/or other suitable hardware) to communicate wirelessly (e.g., via an RF interface) with one or more UEs 1201, one or more other DUs 1303 (e.g., via RUs 1301 associated with DUs 1303), and/or any other suitable type of device. In the uplink direction, RU 1301 may receive traffic from UE 1201 and/or another DU 1303 via the RF interface and may provide the traffic to DU 1303. In the downlink direction, RU 1301 may receive traffic from DU 1303, and may provide the traffic to UE 1201 and/or another DU 1303.

One or more elements of RAN environment 1300 may, in some embodiments, be communicatively coupled to one or more Multi-Access/Mobile Edge Computing ("MEC") devices, referred to sometimes herein simply as "MECs" 1307. For example, DU 1303-1 may be communicatively coupled to MEC 1307-1, DU 1303-N may be communicatively coupled to MEC 1307-N, CU 1305 may be communicatively coupled to MEC 1307-2, and so on. MECs 1307 may include hardware resources (e.g., configurable or provisionable hardware resources) that may be configured to provide services and/or otherwise process traffic to and/or from UE 1201, via a respective RU 1301.

For example, DU 1303-1 may route some traffic, from UE 1201, to MEC 1307-1 instead of to a core network via CU 1305. MEC 1307-1 may process the traffic, perform one or more computations based on the received traffic, and may provide traffic to UE 1201 via RU 1301-1. In some embodiments, MEC 1307 may include, and/or may implement, some or all of the functionality described above with respect to node 103, AF 1230, UPF 1235, and/or one or more other devices, systems, VNFs, CNFs, etc. In this manner, ultra-low latency services may be provided to UE 1201, as traffic does not need to traverse DU 1303, CU 1305, links between DU 1303 and CU 1305, and an intervening backhaul network between RAN environment 1300 and the core network.

Figure 14:
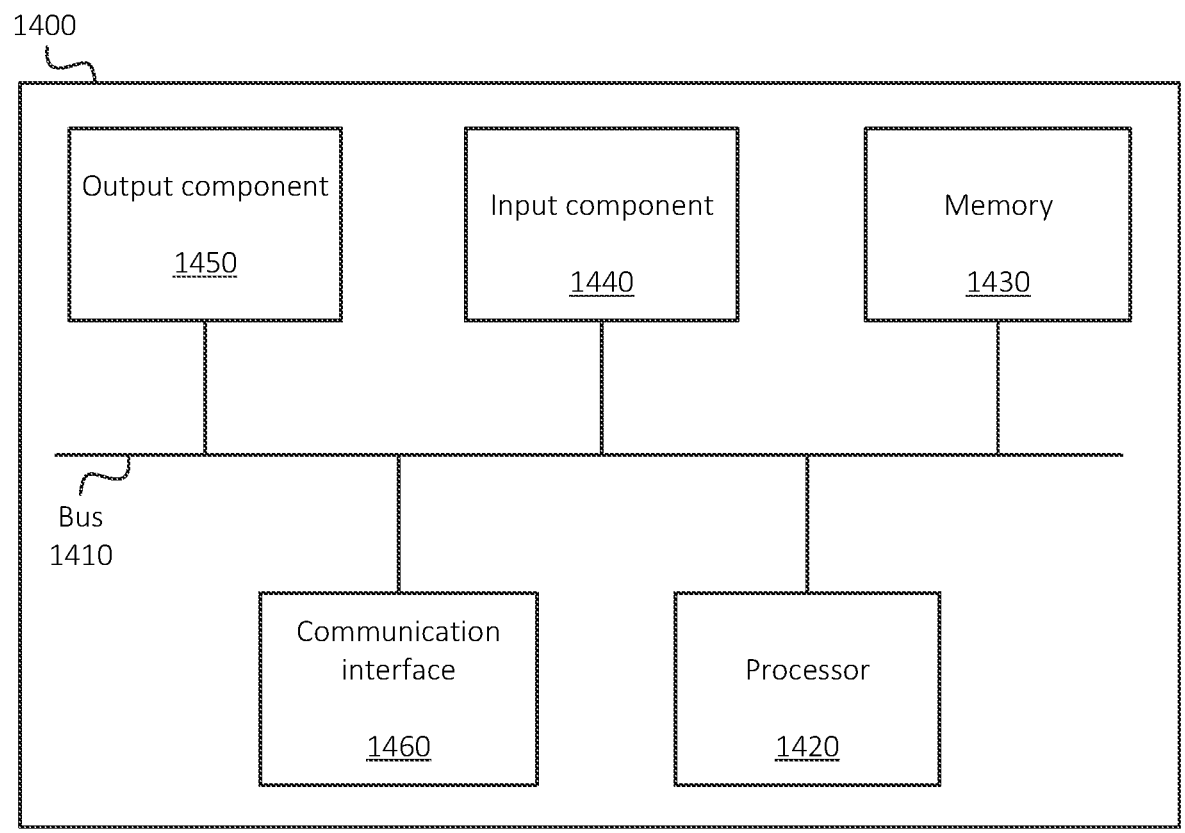
FIG. 14 illustrates example components of one or more devices, in accordance with one or more embodiments described herein.

FIG. 14 illustrates example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. In some embodiments, processor 1420 may be or may include one or more hardware processors. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400 and/or other receives or detects input from a source external to 1440, such as a touchpad, a touchscreen, a keyboard, a keypad, a button, a switch, a microphone or other audio input component, etc. In some embodiments, input component 1440 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   maintain a distributed ledger that is also maintained by at least one other device, wherein the distributed ledger includes a plurality of records, wherein a particular record is a last record of the plurality of records;
   receive one or more requests to record a first record and a second record to the distributed ledger,
     wherein the first record includes a first reference to the particular record as a record that immediately precedes the first record in the distributed ledger,
     wherein the second record includes a second reference to the same particular record as a record that immediately precedes the second record,
     wherein the one or more requests are received prior to recordation of the first and second records to the distributed ledger;
   identify a first value associated with the first record and a second value associated with the second record;
   compare, based on the first and second records each including the reference to the same particular record, the first value to the second value;
   determine, based on the comparing, a sequence of the first and second records, wherein determining the sequence includes determining that the second record is ahead of the first record in the sequence; and
   record the first and second records to the distributed ledger in the determined sequence, wherein after the first and second records are recorded, the second record is ahead of the first record in the distributed ledger.

2. The device of claim 1, wherein the at least one other device also determines the same sequence of the first and second records, and also records the first and second records to the distributed ledger in the determined sequence.

3. The device of claim 1, wherein the one or more processors are further configured to:
  generate a third record for recordation to the distributed ledger, wherein generating the third record includes:
    identifying that the determined sequence indicates that the first record is a subsequent record after the second record; and
    including a reference to the first record in the third record as a record that immediately precedes the third record, based on identifying that the determined sequence indicates that the first record is a subsequent record after the second record.

4. The device of claim 1, wherein the first and second records include, as a payload, one or more respective public keys associated with private keys used to encrypt one or more messages, wherein the one or more public keys are usable to decrypt the one or more messages.

5. The device of claim 1, wherein the first and second values each include a different random number.

6. The device of claim 5, wherein the first value is based on a first identifier of a first device from which the first record is received, and wherein the second value is based on a second identifier of a second device from which the second record is received.

7. The method of claim 6, wherein the first record includes first header information that includes the first reference to the particular record, and wherein the second record includes second header information that includes the second reference to the same particular record.

8. A non-transitory computer-readable medium, storing a plurality of processor-executable instructions to:
  maintain, by a device, a distributed ledger that is also maintained by at least one other device, wherein the distributed ledger includes a plurality of records, wherein a particular record is a last record of the plurality of records;
  receive one or more requests to record a first record and a second record to the distributed ledger,
    wherein the first record includes a first reference to the particular record as a record that immediately precedes the first record in the distributed ledger,
    wherein the second record includes a second reference to the same particular record as a record that immediately precedes the second record,
    wherein the one or more requests are received prior to recordation of the first and second records to the distributed ledger;
  identify a first value associated with the first record and a second value associated with the second record;
  compare, based on the first and second records each including the reference to the same particular record, the first value to the second value;
  determine, based on the comparing, a sequence of the first and second records, wherein determining the sequence includes determining that the second record is ahead of the first record in the sequence; and
  record the first and second records to the distributed ledger in the determined sequence, wherein after the first and second records are recorded, the second record is ahead of the first record in the distributed ledger.

9. The non-transitory computer-readable medium of claim 8, wherein the at least one other device also determines the same sequence of the first and second records, and also records the first and second records to the distributed ledger in the determined sequence.

10. The non-transitory computer-readable medium of claim 8, wherein the plurality of processor-executable instructions further include processor-executable instructions to:
  generate a third record for recordation to the distributed ledger, wherein generating the third record includes:
    identifying that the determined sequence indicates that the first record is a subsequent record after the second record; and
    including a reference to the first record in the third record as a record that immediately precedes the third record, based on identifying that the determined sequence indicates that the first record is a subsequent record after the second record.

11. The non-transitory computer-readable medium of claim 8, wherein the first and second records include, as a payload, one or more respective public keys associated with private keys used to encrypt one or more messages, wherein the one or more public keys are usable to decrypt the one or more messages.

12. The non-transitory computer-readable medium of claim 8, wherein the first and second values each include a different random number.

13. The non-transitory computer-readable medium of claim 12, wherein the first value is based on a first identifier of a first device from which the first record is received, and wherein the second value is based on a second identifier of a second device from which the second record is received.

14. The device of claim 1, wherein the first record includes first header information that includes the first reference to the particular record, and wherein the second record includes second header information that includes the second reference to the same particular record.

15. A method, comprising:
  maintaining, by a device, a distributed ledger that is also maintained by at least one other device, wherein the distributed ledger includes a plurality of records, wherein a particular record is a last record of the plurality of records;
  receiving one or more requests to record a first record and a second record to the distributed ledger,
    wherein the first record includes a first reference to the particular record as a record that immediately precedes the first record in the distributed ledger,
    wherein the second record includes a second reference to the same particular record as a record that immediately precedes the second record,
    wherein the one or more requests are received prior to recordation of the first and second records to the distributed ledger;
  identifying a first value associated with the first record and a second value associated with the second record;
  comparing, based on the first and second records each including the reference to the same particular record, the first value to the second value;
  determining, based on the comparing, a sequence of the first and second records, wherein determining the sequence includes determining that the second record is ahead of the first record in the sequence; and
  recording the first and second records to the distributed ledger in the determined sequence, wherein after the first and second records are recorded, the second record is ahead of the first record in the distributed ledger.

16. The method of claim 15, wherein the at least one other device also determines the same sequence of the first and second records, and also records the first and second records to the distributed ledger in the determined sequence.

17. The method of claim 15, further comprising:
generating a third record for recordation to the distributed ledger, wherein generating the third record includes:
identifying that the determined sequence indicates that the first record is a subsequent record after the second record; and
including a reference to the first record in the third record as a record that immediately precedes the third record, based on identifying that the determined sequence indicates that the first record is a subsequent record after the second record.

18. The method of claim 15, wherein the first and second records include, as a payload, one or more respective public keys associated with private keys used to encrypt one or more messages, wherein the one or more public keys are usable to decrypt the one or more messages.

19. The method of claim 15, wherein the first value is based on a first random number and a first identifier of a first device from which the first record is received, and wherein the second value is based on a second random number and a second identifier of a second device from which the second record is received.

20. The non-transitory computer-readable medium of claim 8, wherein the first record includes first header information that includes the first reference to the particular record, and wherein the second record includes second header information that includes the second reference to the same particular record.

* * * * *